United States Patent
Fröhlich

(10) Patent No.: US 11,778,456 B2
(45) Date of Patent: Oct. 3, 2023

(54) UE WITH INTEGRATED SUBSCRIBER IDENTITY MODULES BY RESOURCE SHARING

(71) Applicant: SHENZHEN GOODIX TECHNOLOGY CO., LTD., Shenzhen (CN)

(72) Inventor: Martin Fröhlich, Dresden (DE)

(73) Assignee: SHENZHEN GOODIX TECHNOLOGY CO., LTD.

(*) Notice: Subject to any disclaimer, the term of this patent is extended or adjusted under 35 U.S.C. 154(b) by 313 days.

(21) Appl. No.: 17/169,422

(22) Filed: Feb. 6, 2021

(65) Prior Publication Data

US 2021/0160690 A1    May 27, 2021

Related U.S. Application Data

(63) Continuation of application No. PCT/EP2019/081215, filed on Nov. 13, 2019.

(30) Foreign Application Priority Data

Feb. 5, 2019 (EP) ..................... 19155419
Sep. 4, 2019 (EP) ..................... 19195307

(51) Int. Cl.
*H04L 29/06* (2006.01)
*H04W 12/02* (2009.01)
(Continued)

(52) U.S. Cl.
CPC ........... *H04W 12/02* (2013.01); *H04L 9/0631* (2013.01); *H04W 12/03* (2021.01);
(Continued)

(58) Field of Classification Search
CPC ... H04W 12/02; H04W 12/03; H04W 12/122; H04W 12/35; H04W 12/42; H04L 9/0631
See application file for complete search history.

(56) References Cited

U.S. PATENT DOCUMENTS

2017/0308697 A1* 10/2017 Lavasani ............... G06F 30/337

FOREIGN PATENT DOCUMENTS

WO   WO-2014101094 A1 *  7/2014  ............ G06F 9/455
WO       2016075622 A1     5/2016
(Continued)

OTHER PUBLICATIONS

Benedek Kovács; Zsolt Vajta; Zsigmond Pap; "Optimizing UICC modules for IoT applications"; Ericsson Technology Review; Year: Apr. 14, 2020; vol. 2020, Issue: 4; Magazine Article; Publisher: Ericsson; pp. 2-11 (Year: 2020).*
(Continued)

*Primary Examiner* — Fatoumata Traore
*Assistant Examiner* — Courtney D Fields
(74) *Attorney, Agent, or Firm* — Emerson, Thomson & Bennett, LLC; Roger D. Emerson; Matthew J. Wilson

(57) ABSTRACT

An improved Narrowband Internet of Things device (UE) supporting resource sharing for integrated Subscriber Identity Modules (iSIM) is provided. The cost per UE is reduced by reducing the chip area and energy consumption of an integrated UICC chip therein since identical components of the modem and the iSIM are designed as shared components, whereas a hardware arbiter manages an access to THE shared components by the modem or the iSIM and prevents information leaking.

18 Claims, 1 Drawing Sheet

(51) Int. Cl.
  *H04W 12/03*   (2021.01)
  *H04W 12/122*  (2021.01)
  *H04W 12/30*   (2021.01)
  *H04W 12/42*   (2021.01)
  *H04L 9/06*    (2006.01)
  *G06F 30/337*  (2020.01)
  *G06F 21/64*   (2013.01)
  *G06F 9/455*   (2018.01)

(52) U.S. Cl.
  CPC ......... *H04W 12/122* (2021.01); *H04W 12/35* (2021.01); *H04W 12/42* (2021.01)

(56) References Cited

FOREIGN PATENT DOCUMENTS

| | | | | |
|---|---|---|---|---|
| WO | WO-2016075622 A1 * | 5/2016 | ............. | G06F 21/64 |
| WO | 2017082966 A1 | 5/2017 | | |
| WO | WO-2017082966 A1 * | 5/2017 | | |

OTHER PUBLICATIONS

Arm: "Unlocking the cellular IoT potential for chipset maker Whitepaper"_XP5666839A, Feb. 1, 2019, pp. 1-7. Retrieved from the Internet: URL: https://learn.arm.com/rs/714-XIJ-402/images/Kigen-Unlocking_whitepaper.pdf.

\* cited by examiner

UE WITH INTEGRATED SUBSCRIBER IDENTITY MODULES BY RESOURCE SHARING

CROSS REFERENCE TO RELATED APPLICATIONS

The present application is a continuation of PCT International application No. PCT/EP2019/081215 filed on Nov. 13, 2019, and entitled "IMPROVED UE WITH AN INTEGRATED SUBSCRIBER IDENTITY MODULES (ISIM) BY RESOURCE SHARING", which claims the priority of the European application No. EP 19155419.5, filed on Feb. 5, 2019, and EP 19195307.4, filed on Sep. 4, 2019, which are hereby incorporated by reference in its entireties.

TECHNICAL FIELD

The disclosure relates to an improved Narrowband Internet of Things device (UE) supporting resource sharing for integrated Subscriber Identity Modules (iSIM).

BACKGROUND

There are standards describing the "classical" SIM/UICC or the embedded version eSIM, see: https://www.gsma.com/esim/. Consumer benefits of such eSIMs include, that a simpler device setup is possible without the need to insert or replace a SIM card; devices can operate independently of a tethered smartphone, with their own subscriptions; and a range of new, enhanced mobile-connected devices benefit from the standardized eSIM.

So far, integrated SIMs (iSIMs) are not yet standardized.

All 3GPP based cellular user equipments (UE), also known as Narrowband Internet of Things devices, such as mobile phone, require a mechanism to prove their identity against the cellular network and to exchange keys for a secure connection.

Therefore, the Universal Integrated Circuit Card (UICC—the hardware), with a USIM application (the software) running on it, is used. The UICC is a high secure hardware module that is connected (wired) to the UE. The USIM application contains all secret keys and provider specific information. The USIM application is provisioned by the cellular operator.

The secret keys inside the USIM application stored on the UICC must not be read out. The keys are used to authenticate the UE against the core network with the help of a cryptographic algorithm. Furthermore, the USIM application generates the secret session keys for the UE.

Thus, each UE requires a USIM application (running on the UICC) to attach to a core network successfully.

The modem to UICC communication is done via wired serial interface which is standardized in ISO/IEC 7816-3.

The disadvantage of a separate UICC is it's embodiment as a separated secure hardware element, a SIM card, which is required in a UE. This causes additional system costs. Cost sensitive systems require a solution where the UICC becomes part of the modem inside the UE. Thus, the integration of the UICC (with the USIM application) is called for integrated Subscriber Identity Modules (iSIM).

A quite simple solution for an iSIM is just to put the UICC chip and the modem chip in one package (SIP—System in Package) or to have the UICC chip as part of the modem chip (FIG. 1).

SUMMARY

The cost per UE is reduced by an embodiment of this disclosure by reducing the chip area and energy consumption of an integrated UICC chip.

an improved Narrowband Internet of Things device (UE) comprising a modem and an integrated Subscriber Identity Module (iSIM) both combined on a modem chip is provided, wherein identical components of the modem and the iSIM are designed as shared components, whereas a hardware arbiter securely manages an access to said shared components by the modem or the iSIM and prevents information leaking.

Integrated Subscriber Identity Modules (iSIMs) require for network authentication and provisioning cryptographic functions like Advanced Encryption Standard (AES), Hash-based Message Authentication Code (HMAC), Elliptic Curve Cryptography or true random numbers. Secure hardware modules, including iSIMs, provide special hardware accelerator to support such functions. Those special hardware accelerators are also used in the modem, e. g. for secure boot, firmware encryption and integrity checking, for encryption of the network packets, or end-to-end data protection with DTLS-Datagram Transport Layer Security.

The usage of shared hardware components requires a secure hardware arbiter that prevents any access of a used component by the other module, either the modem or the iSIM and prevents information leaking.

In a preferred embodiment of the inventive UE, the hardware arbiter comprises a timer for preventing blocking of said shared components. If an attacker can execute code on a modem or an application processor, he allocates the resource or component and, in the worst case, never releases that resource or component again, thus blocking the entire system. With the timer, the arbiter can specify that a resource can only be used for a certain time. After the timer has expired, the resource is forced to be released again.

So, in a further preferred embodiment of the inventive UE, the hardware arbiter ensures real-time operating and hence preventing the blocking of a shared component. A blocked component can be released either through a request of the modem for example or after the timer has expired. This prevents that the system fails entirely and ensures a real-time operating.

In another embodiment of the inventive UE, the hardware arbiter provides reset and/or RAM cryptography processing for securely removing all information that remains after usage of said shared components by the modem or the iSIM.

In an embodiment of the inventive UE the shared components are cryptographic accelerators. Cryptographic accelerators are suitable because they can be reset easily to remove all remaining information. The securely removing of information in registers after usage can be done by a reset. These components are rarely. An access protection module will grand access only to one party—iSIM or modem. The other has to wait till the usage was finished.

If asymmetric cryptography is used, which is based on elliptic curves, one need RAM, which as such has no reset. For securely removing the information inside the RAM there is either the possibility to overwrite the RAM with random data by means of a routine. Or alternatively an XOR mask with a random value can be used. All data written to RAM will be XOR-ed with the XOR mask. The XOR mask, which is stored in a register, is then reset. Only if one knew the value of the XOR mask, a recovery of the RAM would be possible.

To summarize, the arbiter may prevent information leaking.

Embodiments of this disclosure will be explained in more detail using exemplary embodiments.

DETAILED DESCRIPTION OF EMBODIMENTS

Figure 1:
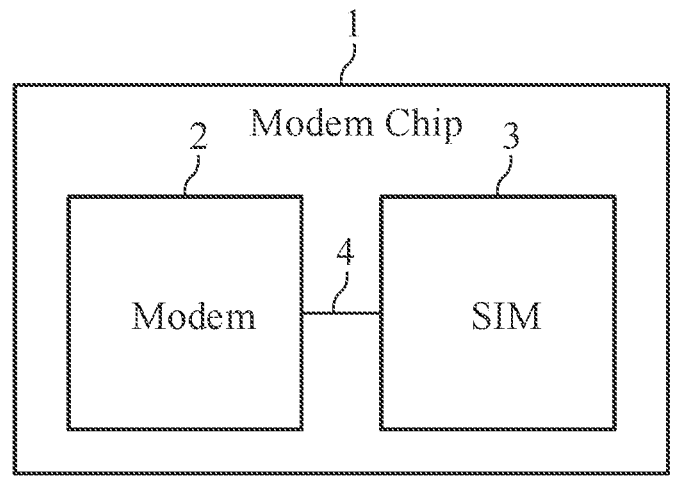
FIG. 1 Basic components of an iSIM (state-of-the-art)
Figure 2:
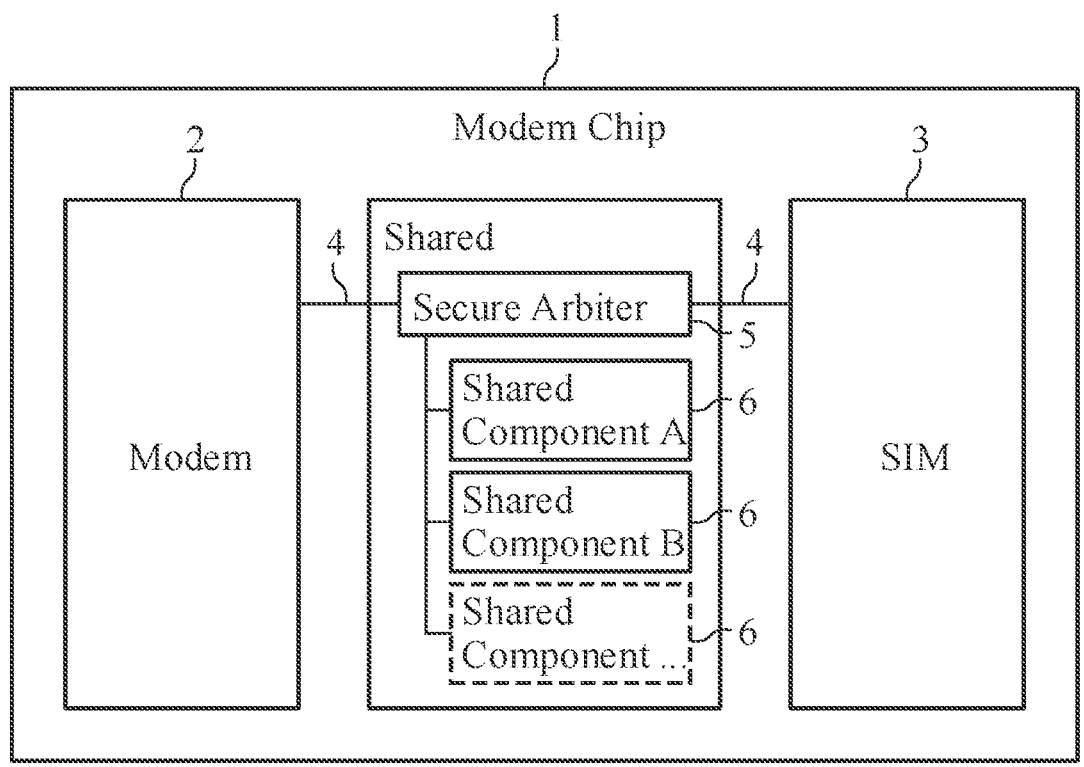
FIG. 2 Secure component sharing via a secure arbiter.

FIG. 2 illustrates the inventive UE with a modem chip which comprises a modem and an iSIM. The modem and the iSIM share components which are used by both—the modem and the iSIM. A shared component can be typically cryptographic accelerators which is used e.g. for AES, HMAC, Elliptic Curve Cryptography or true random number generator. For example, an AES core is used by the iSIM for data-encryption or data-decryption or session key generation. After the network authentication and provisioning the iSIM releases the AES core. The secure hardware arbiter ensures that all information is removed after the usage. Afterwards, the modem uses the AES core for data (packet data) encryption or decryption. It is important, that the hardware arbiter prevents any access of the AES core by the respective other component (modem or iSIM) if it is used.

It is also important that the hardware arbiter obfuscate the access time to prevent side channel attacks, because the execution time of asymmetric crypto accelerators is key dependent. This is done by some hardware that generates randomly non operation cycles or stops the clock for some cycles.

The modem is booting and uses the AES for the firmware image decryption and the Error Correcting Code (ECC) module to verify the firmware signature. Afterwards the modem starts the iSIM. The iSIM does the same with the firmware. The modem tries to connect to the network. The modem receives the authenticate data from the network and sends the data to the iSIM. The iSIM uses the AES to check the authentication data, generates the response and the session keys for the modem. The modem uses the session keys to encrypt and/or decrypt the network data.

LIST OF REFERENCE SIGNS 1 modem chip
2 modem
3 integrated Subscriber Identity Module
4 serial interface
5 secure hardware arbiter
6 shared component

What is claimed is:

1. A Narrowband Internet of Things device (UE), comprising a modem and an integrated Subscriber Identity Module (iSIM) both combined on a modem chip, wherein identical components of the modem and the iSIM are designed as shared components, and the shared components are cryptographic accelerators that are used in the iSIM for network authentication and provisioning and in the modem for secure boot, firmware encryption and integrity checking and encryption of network packets, or end-to-end data protection with Datagram Transport Layer Security, whereas a secure hardware arbiter manages an access to the shared components by the modem or the iSIM and prevents information leaking, wherein the hardware arbiter comprises a timer for preventing blocking of the shared components.

2. The UE according to claim 1, wherein when an attacker executes code on the modem or an application processor, the hardware arbiter allocates a resource or component.

3. The UE according to claim 2, wherein the hardware arbiter never releases the resource or component again.

4. The UE according to claim 1, wherein with the timer, the hardware arbiter specifies that a resource only be used for a certain time and after the timer has expired, the resource is forced to be released again.

5. The UE according to claim 1, wherein the hardware arbiter ensures real-time operating.

6. The UE according to claim 5, wherein a blocked component is released either through a request of the modem or after the timer has expired.

7. The UE according to claim 1, wherein the hardware arbiter provides reset and/or RAM cryptography processing for removing information that remains after usage of the shared components by the modem or the iSIM.

8. The UE according to claim 1, wherein the hardware arbiter provides reset and/or RAM cryptography processing for securely removing all information that remains after usage of the shared components by the modem or the iSIM.

9. The UE according to claim 1, the cryptographic accelerators be reset to remove all remaining information.

10. The UE according to claim 9, an access protection module grants access only to one party—iSIM or modem and the other has to wait till the usage is finished.

11. The UE according to claim 1, wherein all data written to RAM will be XOR-ed with the XOR mask and the XOR mask, which is stored in a register, is then reset.

12. The UE according to claim 1, wherein an Advanced Encryption Standard (AES) core is used by the iSIM for data-encryption or data-decryption or session key generation.

13. The UE according to claim 12, wherein after the network authentication and provisioning the iSIM releases the AES core.

14. The UE according to claim 13, wherein after the hardware arbiter ensures that all information is removed after the usage, the modem uses the AES core for data encryption or decryption.

15. The UE according to claim 1, wherein the hardware arbiter obfuscates the access time to prevent side channel attacks.

16. The UE according to claim 1, wherein the modem is booted and uses an AES for a firmware image decryption and an Error Correcting Code (ECC) module to verify the firmware signature.

17. The UE according to claim 16, wherein the modem tries to connect to the network and the modem receives the authenticate data from the network and sends the data to the iSIM.

18. The UE according to claim 16, wherein the iSIM uses the AES to check the authentication data, and generates the response and the session keys for the modem and the modem uses the session keys to encrypt and/or decrypt the network data.

* * * * *